US012572550B2

(12) United States Patent
McGovern

(10) Patent No.: US 12,572,550 B2
(45) Date of Patent: Mar. 10, 2026

(54) METHOD AND SYSTEM FOR OPTIMIZING A WEBSITE FOR SEARCH ENGINES

(71) Applicant: HATS VENTURES LLC, Wilmington, DE (US)

(72) Inventor: Scott McGovern, Warwick, NY (US)

( * ) Notice: Subject to any disclaimer, the term of this patent is extended or adjusted under 35 U.S.C. 154(b) by 0 days.

(21) Appl. No.: 18/793,438

(22) Filed: Aug. 2, 2024

(65) Prior Publication Data

US 2025/0045282 A1 Feb. 6, 2025

Related U.S. Application Data

(60) Provisional application No. 63/530,435, filed on Aug. 2, 2023.

(51) Int. Cl.
| | |
|---|---|
| *G06F 7/00* | (2006.01) |
| *G06F 16/2457* | (2019.01) |
| *G06F 16/951* | (2019.01) |
| *G06F 17/00* | (2019.01) |

(52) U.S. Cl.
CPC ...... G06F 16/24578 (2019.01); G06F 16/951 (2019.01)

(58) Field of Classification Search
CPC ........................ G06F 16/24578; G06F 16/951
USPC ........................................................ 707/711
See application file for complete search history.

(56) References Cited

U.S. PATENT DOCUMENTS

| | | | | |
|---|---|---|---|---|
| 8,364,662 | B1 * | 1/2013 | Moyer | G06F 16/958 |
| | | | | 707/706 |
| 8,396,857 | B2 | 3/2013 | Kamel et al. | |
| 8,650,191 | B2 * | 2/2014 | Connolly | G06F 16/958 |
| | | | | 707/758 |
| 8,793,246 | B1 * | 7/2014 | Mathur | G06F 16/24578 |
| | | | | 707/723 |
| 8,990,206 | B2 | 3/2015 | Connolly et al. | |
| 9,619,525 | B2 | 4/2017 | Adams et al. | |
| 10,346,483 | B2 | 7/2019 | Drai et al. | |
| 10,534,781 | B2 | 1/2020 | Dzumla et al. | |
| 10,698,961 | B2 | 6/2020 | Clay | |
| 2007/0244872 | A1 * | 10/2007 | Hancock | G06Q 30/0275 |
| 2009/0094137 | A1 * | 4/2009 | Toppenberg | G06Q 30/02 |
| | | | | 707/E17.112 |
| 2010/0114864 | A1 * | 5/2010 | Agam | G06F 16/951 |
| | | | | 707/706 |

(Continued)

OTHER PUBLICATIONS

International Search Report and Written Opinion, International App. No. PCT/US2024/40812, Issued Oct. 18, 2024 (11 pages).

*Primary Examiner* — Pavan Mamillapalli
(74) *Attorney, Agent, or Firm* — Patent Authority LLC; Elliot Furman

(57) ABSTRACT

A method and system optimizes a website to improve its search engine ranking. Target keywords to be associated with a target website are selected. A search engine is queried with the target keywords and search engine results are received. Elements of high-ranking organic websites are analyzed and descriptive text associated with those websites are extracted. The descriptive text is rewritten by artificial intelligence, incorporating the analyzed elements. Source code of the target website is modified with the rewritten descriptive text and the target website is republished, causing it to be re-indexed and re-ranked. The method is repeated periodically to adapt the target website to unknown and unexpected changes to the search engine algorithm.

18 Claims, 6 Drawing Sheets

(56) References Cited

U.S. PATENT DOCUMENTS

| | | | |
|---|---|---|---|
| 2011/0016104 A1 | 1/2011 | Leconte | |
| 2012/0284252 A1 | 11/2012 | Drai et al. | |
| 2013/0179420 A1* | 7/2013 | Park | G06F 16/9535 |
| | | | 707/706 |
| 2015/0058339 A1* | 2/2015 | Nijer | G06F 16/951 |
| | | | 707/736 |
| 2015/0154162 A1* | 6/2015 | Nijer | G06F 40/146 |
| | | | 715/234 |
| 2019/0370350 A1 | 12/2019 | Chung et al. | |
| 2021/0357375 A1* | 11/2021 | Urdiales | G06N 3/0499 |

* cited by examiner

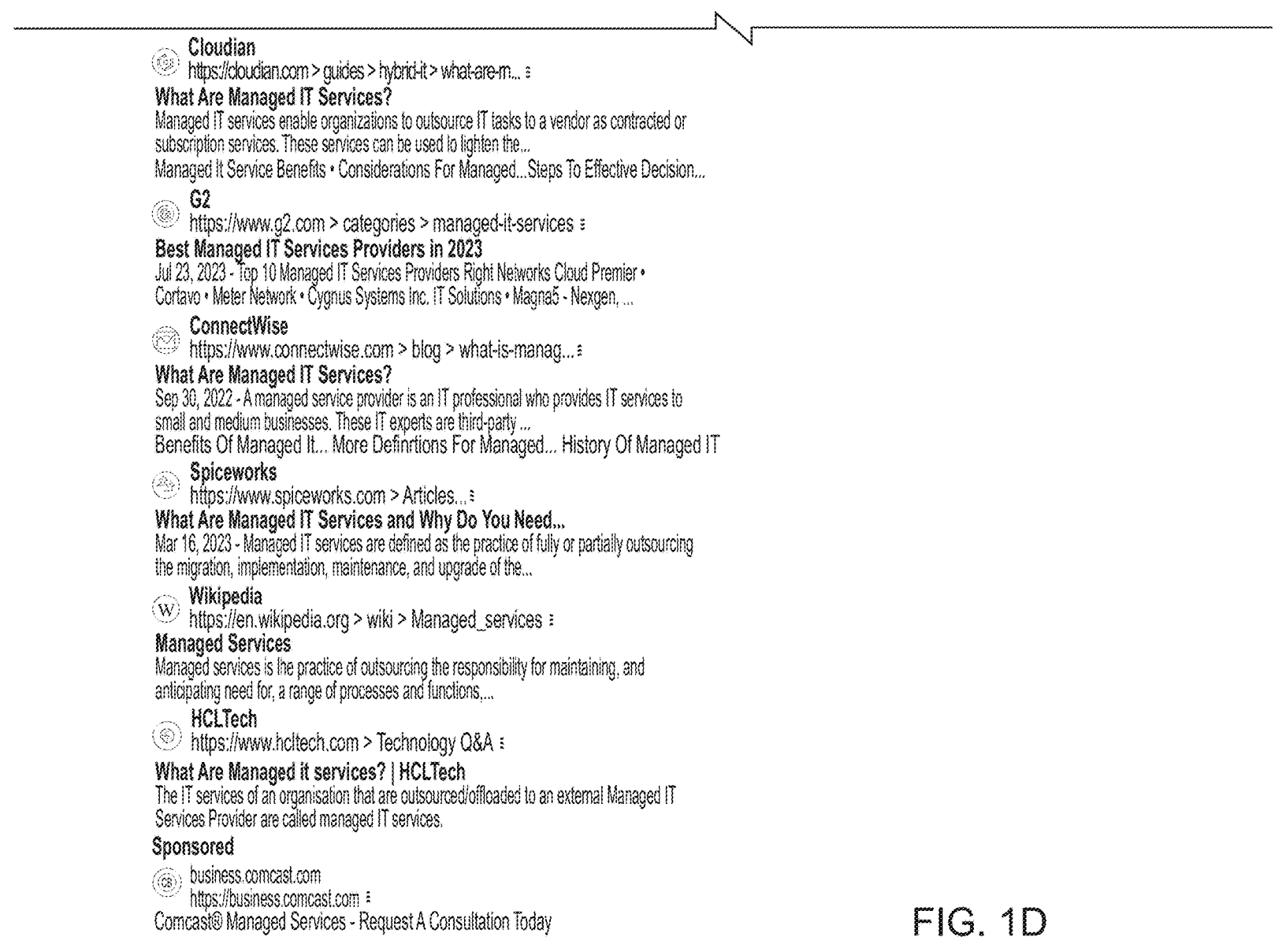

Cloudian
https://cloudian.com > guides > hybrid-it > what-are-m... ⋮
What Are Managed IT Services?
Managed IT services enable organizations to outsource IT tasks to a vendor as contracted or
subscription services. These services can be used to lighten the....
Managed It Service Benefits · Considerations For Managed... Steps To Effective Decision...

G2
https://www.g2.com > categories > managed-it-services ⋮
Best Managed IT Services Providers in 2023
Jul 23, 2023 - Top 10 Managed IT Services Providers Right Networks Cloud Premier ·
Cortavo · Meter Network · Cygnus Systems Inc. IT Solutions · Magna5 · Nexgen, ...

ConnectWise
https://www.connectwise.com > blog > what-is-manag...⋮
What Are Managed IT Services?
Sep 30, 2022 - A managed service provider is an IT professional who provides IT services to
small and medium businesses. These IT experts are third-party...
Benefits Of Managed It... More Definitions For Managed... History Of Managed IT

Spiceworks
https://www.spiceworks.com > Articles...⋮
What Are Managed IT Services and Why Do You Need...
Mar 16, 2023 - Managed IT services are defined as the practice of fully or partially outsourcing
the migration, implementation, maintenance, and upgrade of the....

Wikipedia
https://en.wikipedia.org > wiki > Managed_services ⋮
Managed Services
Managed services is the practice of outsourcing the responsibility for maintaining, and
anticipating need for, a range of processes and functions....

HCLTech
https://www.hcltech.com > Technology Q&A ⋮
What Are Managed it services? | HCLTech
The IT services of an organisation that are outsourced/offloaded to an external Managed IT
Services Provider are called managed IT services.

Sponsored
business.comcast.com
https://business.comcast.com ⋮
Comcast® Managed Services - Request A Consultation Today

FIG. 1D

METHOD AND SYSTEM FOR OPTIMIZING A WEBSITE FOR SEARCH ENGINES

CROSS-REFERENCE TO RELATED APPLICATIONS

This application claims the benefit of U.S. Provisional Application No. 63/530,435, filed Aug. 2, 2023, which is hereby incorporated by reference.

BACKGROUND OF THE INVENTION

Search Engine Optimization (SEO) is the practice of optimizing a website to improve its visibility and ranking on search engine results pages (SERPs). The primary goal of SEO is to increase organic, non-paid traffic to a website by making it more accessible and appealing to both users and search engine algorithms. By using various techniques and strategies, SEO aims to ensure that a website appears at the top of search engine results when users search for relevant keywords or phrases.

SEO is of paramount importance for websites for several reasons. For example, the vast majority of internet users rely on search engines to find information, products, and services. If a website is not properly optimized, it risks being buried in the depths of search engine results, making it difficult for potential visitors to discover. By optimizing a website, it becomes more visible and accessible, attracting a higher volume of relevant traffic. Additionally, SEO helps build credibility and trust. Websites that rank high on search engine results are often perceived as more reliable and authoritative, which can positively impact a brand's reputation. Increased visibility and credibility can lead to higher click-through rates, longer engagement, and ultimately more conversions.

However, SEO comes with its share of challenges. Search engines like Google, Bing, and others keep their search algorithms secret. To further complicate things, they also modify their search algorithms. This could happen multiple times a day, or even based on individual searches. The secretive and ever-evolving nature of search engine algorithms presents some significant challenges.

One of the main reasons why search engines keep their search engine algorithms secret is to prevent manipulation and maintain the integrity of their search results. If the inner workings of the algorithms were disclosed, website owners could exploit this information to artificially boost their rankings without providing genuine value to users. By keeping the algorithms secret, search engines can help ensure that websites are rewarded based on the relevance and quality of their content, encouraging a fair and competitive online landscape.

When search engines constantly update their algorithms to provide better or different search results to users, SEO practices must adapt accordingly. Unfortunately, figuring out which techniques to use for SEO is akin to a cat and mouse game due to the complexity of search engine algorithms. Search engines like Google employ well over 100 parameters in their algorithms to determine how websites are ranked in search results, and these variables are meticulously kept under wraps. SEO practitioners constantly strive to decipher these ever-evolving algorithms, experimenting with various strategies to stay ahead in the rankings race. However, as search engines continuously tweak their algorithms to provide better or different search results, the tactics that once worked effectively may become less effective or even detrimental to a website's ranking.

Thus a need presently exists for method and system for optimizing a website to improve its search engine ranking that is predicable, consistent, and automatically adjusts to secretive and ever-changing search engine algorithms.

SUMMARY OF THE INVENTION

A method for optimizing a website to improve its search engine results comprises a plurality of steps. A target website is provided. The target website comprises source code. The source code comprises a parameter. The parameter comprises an untruncated meta tag. At least one target keyword to be associated with the target website is selected.

A search engine is queried with the at least one target keyword. The search engine results are received from the search engine. The search engine results comprises source code, and the source code comprises a plurality of websites ranked in an order determined by a search algorithm of the search engine. The source code comprises truncated descriptive text associated with at least some of each of the plurality of websites.

Next, a high-ranking website in the search engine results is selected. Truncated descriptive text associated with the selected website is extracted from the search engine results. The number of characters in the truncated descriptive text is determined.

Then, the truncated descriptive text is rewritten with artificial intelligence so that it has a length no longer than the number of characters previously determined. The target website source code is modified with the rewritten descriptive text. In one embodiment, modifying comprises replacing the untruncated meta data of the target website with the rewritten truncated descriptive text. Then the target website is republished, wherein the website is re-indexed and re-ranked by the search engine. The process is repeated periodically, whereby the target website source code is periodically modified in response to changes in the search engine algorithm which indexes and ranks the websites.

BRIEF DESCRIPTION OF THE DRAWINGS

FIGS. 1A-1D show search engine results pages for an exemplary search using the keywords "managed it services".

DETAILED DESCRIPTION

Search engine algorithms index and rank websites by examining the website's source code. Numerous variables and elements of the website's source code are analyzed by the search engine algorithm. The website itself is hosted on an internet-connected web server and comprises machine-readable source code. When this code is executed by a processor of a computer in a web browser on a remote computer, it displays the content of the website to the user.

The website's source code is accessible to any internet-connected computer, including search engine servers that execute search engine algorithms. These algorithms examine the website's source code to index and rank it. Subsequently, the search engine generates and hosts machine-readable source code for search engine results (SER) pages. When accessed by a web browser on a remote computer, this SER source code displays the search engine results pages to the user, allowing them to interact with the search engine and its results.

While the SER source code is executed in a web browser on a remote computer for the purpose of displaying to the user and enabling interaction, the SER source code itself remains machine-readable and therefore may also be read and analyzed by software executing on a remote computer.

The SER source code can be programmatically accessed and analyzed through various methods, including Python, Selenium WebDriver, Python, libraries such as Beautiful Soup, and other tools and languages known by those having ordinary skill in the art. For example, Selenium WebDriver enables automated browsing and interaction with websites, which include SERPs.

Figure 1A:
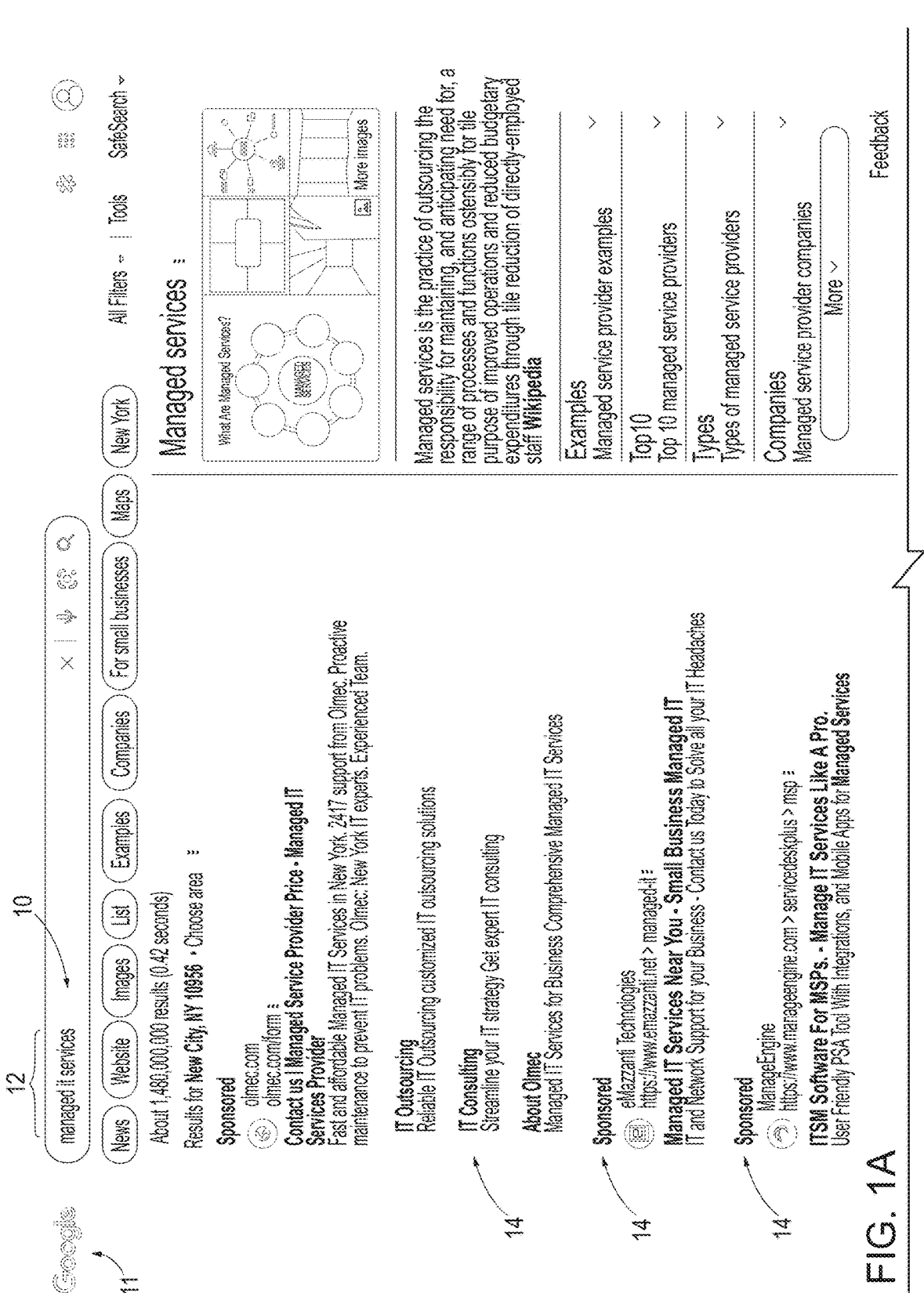
Figure 1B:
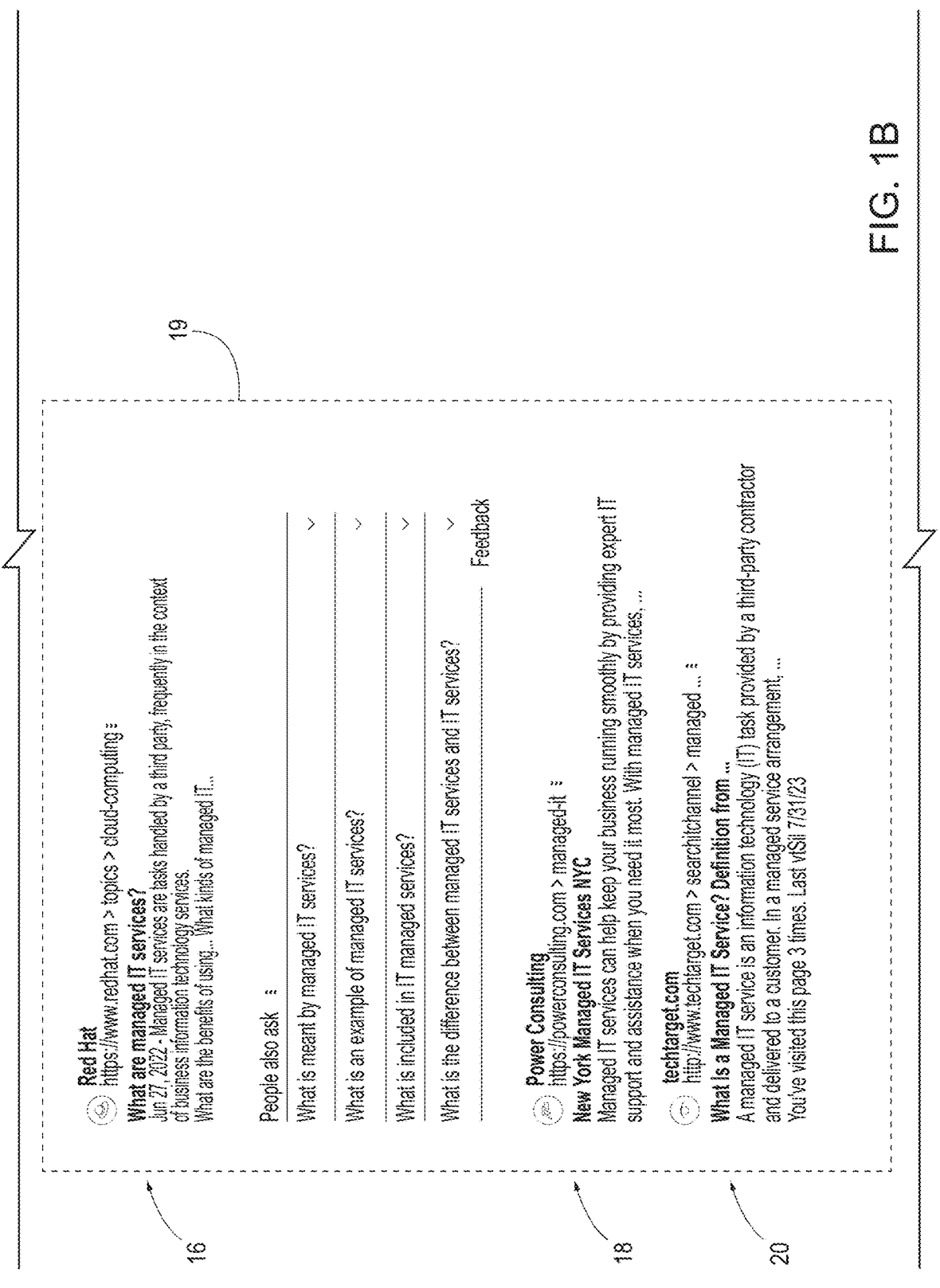
Figure 1C:
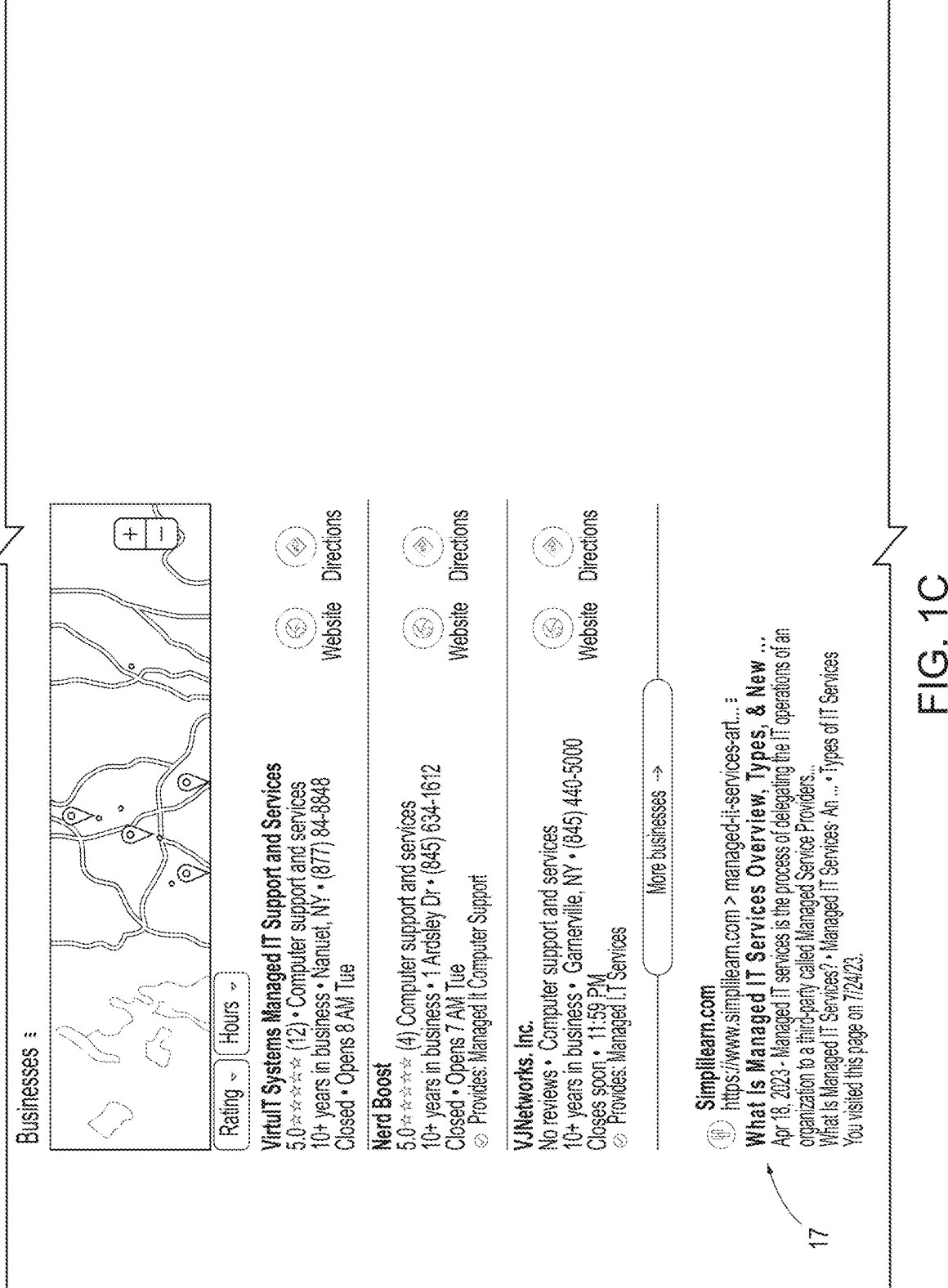

FIGS. 1A, 1B, 1C, and 1D show the first two search engine results pages (SERPs) for an exemplary search using the keywords "managed it services", the SERP code being rendered by a computer processor in a web browser. FIGS. 1A and 1B correspond to the first page of the SERP but have been illustrated on two pages to comply with drawing requirements. FIGS. 1C and 1D represent the second page of the SERP but have been illustrated on two pages to comply with drawing requirements.

Hereinafter, any reference to FIG. 1A shall also be construed as a reference to FIG. 1B, as both figures collectively represent the same page of the SERP. Similarly, any reference to FIG. 1C shall also be construed as a reference to FIG. 1D, as both figures collectively represent the same subsequent page of the SERP. These references are intended to encompass the entirety of the content depicted across the respective figures.

Alternatively, the first page of the SERP may be collectively referenced as FIGS. 1A/B, and the second page may be collectively referenced as FIGS. 1C/D. For clarity, FIGS. 1A and 1B together represent the first page of the SERP, while FIGS. 1C and 1D together represent the second page.

The first SERP shown in FIGS. 1A/B is most prominent and users are most likely to click on the links on that page. The second SERP shown in FIGS. 1C/D continues to display the search results. For illustrative purposes, only two pages FIGS. 1A/B, 1C/D representing the first two SERPs are shown. However, those skilled in the art will appreciate that there exists a plurality of SERPs that could continue for a multiplicity of pages.

The first SERP page of FIGS. 1A/B comprises a plurality of elements. In this example, the Google search engine 11 is used, but other search engines such as Bing may be used. These other search engines comprise similar elements in their SERPs and operate similarly.

The SERP of FIGS. 1A/B comprises a search box 10 to query the search engine and to show which keywords were searched for. In this example, the keywords "managed it services" 12 are search for illustrative purposes, but it is understood that any search words and any number of search words may be used.

Beneath search box 10 are the search engine results. The results include a plurality of sponsored results 14 displayed above organic links 16, 18, 20. Sponsored results are paid advertisements that appear on search engine results pages when a user searches for certain keywords, in this case "managed it service" 11. They are displayed when a business or individual pays the search engine to display their link on the user's search result page.

Organic links 16, 18, 20 in the search engine include non-paid, natural, and unpaid link that appears in response to the query 12. These websites are considered more trustworthy and credible by users compared to paid ads. Users tend to click on organic links more often as they are perceived to be more relevant and valuable. For website owners, appearing in the top organic search results is highly desirable, as it can lead to increased organic traffic, better user engagement, and higher chances of conversions, without having to pay for each click like in a pay-per-click (PPC) advertising model.

The organic links on the SERPs are displayed according to the search engine algorithm which indexes websites and ranks them. Higher ranked websites are displayed first followed by lower ranked ones.

FIGS. 1C/D shows the second SERP which includes lower ranked websites such as search engine result 22 and the other websites that follow. The rankings of the websites decrease the further down they appear on the SERPs.

Figure 2:
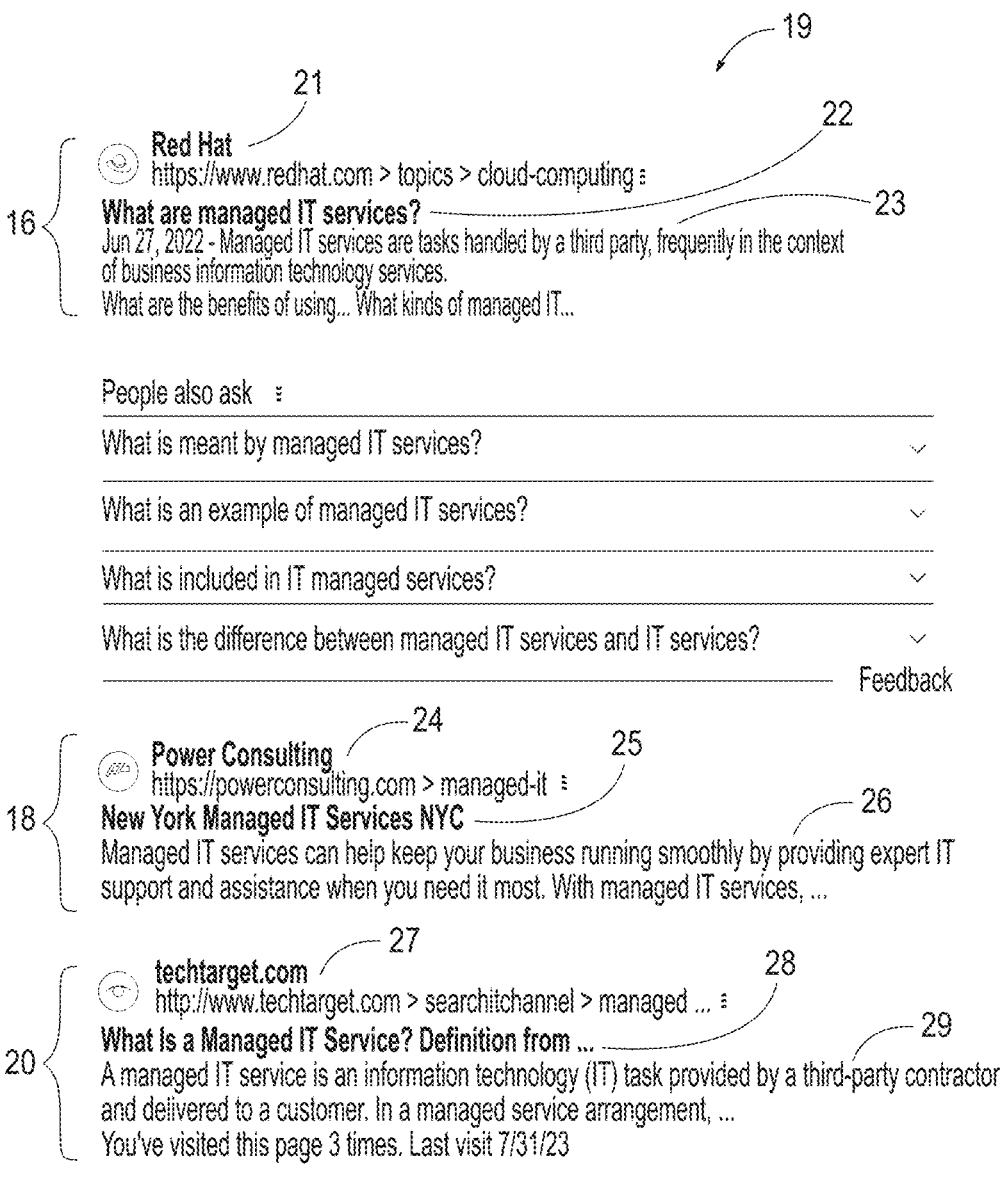
FIG. 2 shows an enlarged section showing the first three highest ranked organic websites of the search engine results.

FIG. 2 shows an enlarged section (19 of FIG. 1B) showing the first three highest ranked organic websites of the search engine results 16, 18, 20. Each result comprises at least three elements: a website 21, 24, 27; a title 22, 25, 28; and a description 23, 26, 29. The results on other SERPs comprise these at least three elements as well.

The highest ranked result 16 is the website 21 "Red Hat" which also includes a link to the website. Associated with the website is the title 22 "What are managed IT services?" and a description "Managed IT services are tasks handled by a third party, frequently in the context of business information technology services." The various elements comprise hyperlinks to the associated website. It is noted that that description comprises the keywords "managed IT services", as does the title.

The second highest ranked result 18 is website 24 "Power Consulting". Associated with the website is the title 25 "New York Managed IT Services NYC" and a description 26 "Managed IT services can help keep your business running smoothly by providing expert IT support and assistance when you need it most. With managed IT services, . . . " It is noted that that description comprises the keywords "managed IT services", as does the title.

Note that in this result 18, the description is truncated as indicated by the ellipsis after the word "services,". The source code of this website which was indexed and ranked by the search engine algorithm comprised a description that exceeded some unknown length set by the search engine algorithm, and was ranked accordingly, below search result 18.

The third highest ranked result 20 is website 27 "techtarget.com". Associated with the website is the title 28 "What Is a Managed IT Service? Definition from . . . " and description 29 "A managed IT service is an information technology (IT) task provided by a third-party contractor and delivered to a customer. In a managed service arrangement, . . . " It is noted that that description comprises the keywords "managed IT services", as does the title.

In this particular search result 20, both the title 28 and description 29 appear truncated, evident from the presence of ellipsis. During the indexing and ranking process, the search engine algorithm encountered an issue related to the lengths of the title and description for this website 27, leading to their truncation and subsequent lower ranking compared to the previous websites.

There are a plurality of elements, more than a hundred, that affect ranking. A partial and by no means exhaustive list include: keywords; title tags; meta descriptions; header tags; URL structure; optimization of images; image ALT text; content quality; whether the website is mobile friendly; page loading speed; schema markup to provide additional context and information to search engines; internal linking; backlinks; factors like click-through rate, bounce rate, time on page; freshness of content, that is whether it is regularly updated; SSL certificates; domain age; geolocation.

These are just some of the variables and elements that search engine algorithms consider when determining how websites are indexed and ranked in search results. The specific weight and importance of each factor may vary depending on the search engine's algorithm and the nature of the query.

While there are many variables, the wording, length, and presence of keywords in a website's title and description are the most impactful elements in determining rank, even if the actual working of the search engine algorithm is unknown due to secrecy. In particular, the meta title and meta description have a large effect on a website's ranking and therefore its position on the SERP as an organic result. Meta title correlates with the title is results (e.g. 22) a results of SERP and meta description correlates with the description (e.g. 23).

Therefore, rewriting a website's meta title and meta description in a particular way can have a direct, predictable, and consistent effect on the website's ranking.

Figure 3:
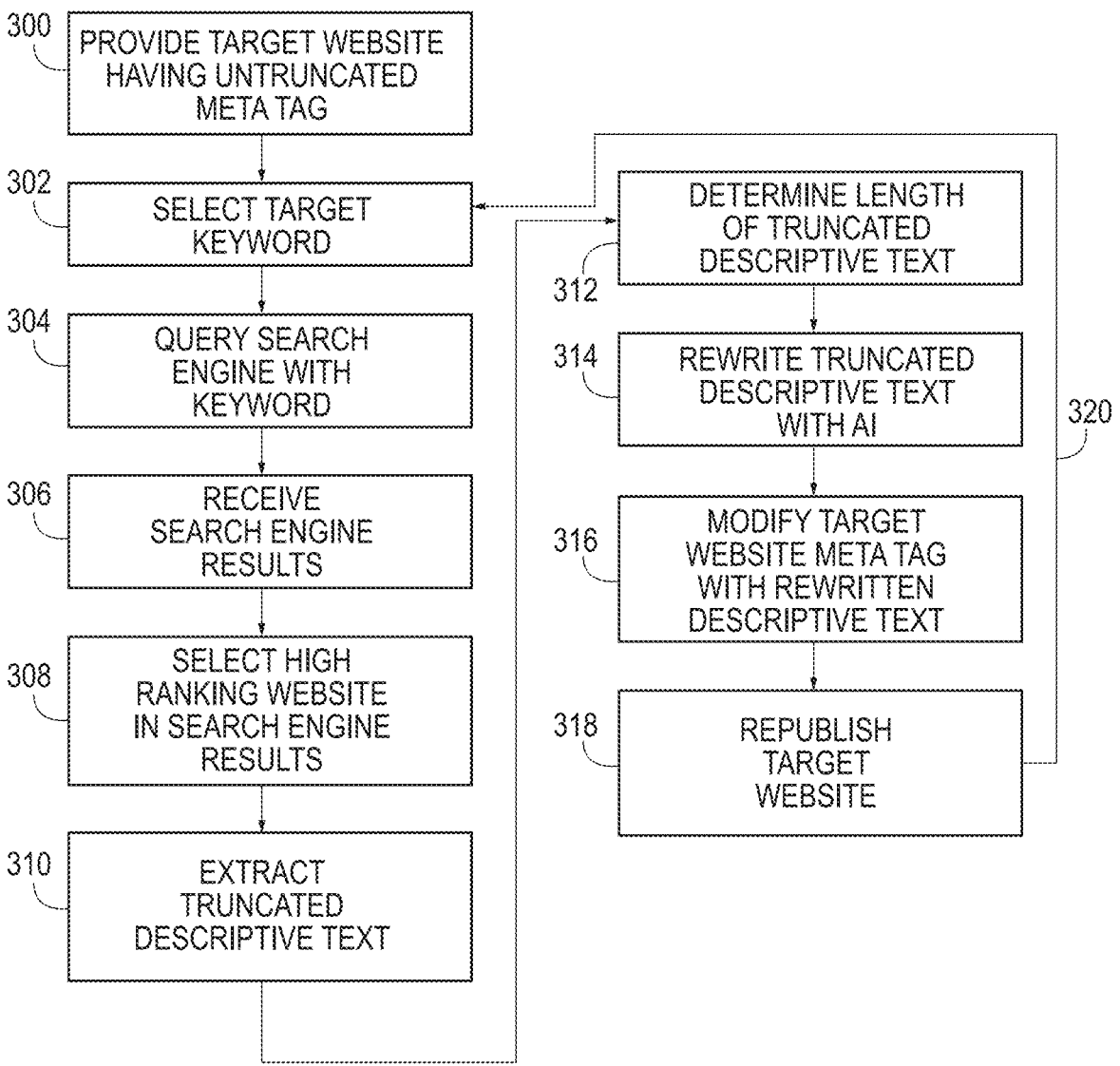
FIG. 3 shows a method for optimizing a website to improve its search engine ranking.

With the above in mind, FIG. 3 shows a method for optimizing a website to improve its search engine ranking.

At step 300, a target website to be optimized for a particular target keyword, keywords, or phrase is provided. The terms, keyword, keywords, or phrase are used interchangeably herein. Accordingly, reference to a keyword is understood to mean one or more keywords. And, a phrase means one or more keywords. The target website comprises source code. The source code is machine readable. When this code is executed by a processor on a remote computer, it causes the remote computer to display the content of the website to a user.

The source code comprises a parameter. The parameter comprises an untruncated meta tag. In one embodiment the source code comprises a plurality of parameters comprising a plurality of meta tags. One type of meta tag is a meta title. Another type of meta tag is a meta description. There are many other types of parameters.

The ranking of the target website may already be high and it is desirable to the website administrator to keep it high in the face of changes to the search engine algorithm. Additionally, the website administrator may want to optimize the website for different keywords than it is currently optimized for. Alternatively, the target website may not be as high in the organic search results so the website should be optimized to move it up in the search engine results page, thereby ensuring higher visibility to people searching for those keywords and increasing clickthrough rate.

By way of example, for an exemplary point in time, just a few of the parameters which comprise meta tags for the website www.techtarget.com/searchitchannel/definition/managed-IT-service (20 of FIG. 1B) is shown below in the snippet of website source code:

```
<meta name="description" content="A managed IT service agreement
transfers the responsibility for maintaining IT from the customer to
a service provider. Learn about services and pricing." />
    <meta name="robots" content="noodp" />
    <link rel="canonical"
href="https://www.techtarget.com/searchitchannel/definition/managed-
IT-service" />
    <meta property="og:title" content="What Is a Managed IT Service?
Definition from SearchITChannel" />
    <meta property="og:site_name" content="IT Channel" />
```

-continued

```
    <meta property="og:url"
content="https://www.techtarget.com/searchitchannel/definition/manag
ed-IT-service" />
    <meta property="og:description" content="A managed IT service
agreement transfers the responsibility for maintaining IT from the
customer to a service provider. Learn about services and pricing."
/>
    <meta property="fb:app_id" content="870327132989388" />
    <meta property="og:type" content="article" />
    <meta property="og:locale" content="en_US" />
    <meta property="article:publisher"
content="https://www.facebook.com/searchitchannel/" />
    <meta name="twitter:card" content="summary_large_image" />
    <meta name="twitter:site" content="@TTBusinessTech" />
    <meta name="twitter:title" content="What Is a Managed IT Service?
Definition from SearchITChannel" />
    <meta name="twitter:description" content="A managed IT service
agreement transfers the responsibility for maintaining IT from the
customer to a service provider. Learn about services and pricing."
/>
```

Turning back to FIGS. 1A/B and 2, this website is shown in the SERP labeled as 20. Recalling from the disclosure above, the title 28 was truncated to "What Is a Managed IT Service? Definition from . . . ."

Reviewing the snippet of website code above for the meta title, the parameter "og:title" comprises the content "What Is a Managed IT Service? Definition from SearchITChannel".

As can be seen the search engine algorithm is displaying a truncated version of the meta title. In some cases, the search engine algorithm may display a title in the SERP that is different than the meta title coded in the website's source code and that title may be truncated. Because the search engine algorithm is secret, it is impossible to know exactly how it is using the meta data and other content of the source code to generate a title 28 in the SERP. Whatever the inner working of the search engine algorithm are and however it creates a title for the SERP, in this example it considered the length of the title too long, contributing to a lower ranking and it being displayed (27 of FIG. 2) in the SERP in truncated form. That is, the meta title is not optimized for the search engine algorithm.

Similarly, the meta description is not optimized for the search engine algorithm. The truncated description 29 in the SERP is "A managed IT service is an information technology (IT) task provided by a third-party contractor and delivered to a customer. In a managed service arrangement, . . . ".

Reviewing the website code above, the meta description parameter "og:description" comprises the content "A managed IT service agreement transfers the responsibility for maintaining IT from the customer to a service provider. Learn about services and pricing." This is different than the description 29 used by the search engine algorithm. Because the search engine algorithm is secret, it is impossible to know exactly how the search engine algorithm is generating the description 29 from the website 27 source code content. However, whatever it is doing, the content is too long so it is truncated. And, whatever it is doing, the meta description in the source code for the website does not match what the search engine algorithm considers the description. These inconsistencies result in a lower ranking and therefor a lower position the organic search engine results.

At step 302, at least one target keyword to be associated with the target website is selected. Any keyword or keywords may be chosen to optimize the website for a search engine search using those keywords. In the example above, the target keywords are "managed IT services". A website administrator may choose keywords and phrases they think are most relevant to their industry and the goods and services they are selling. In one embodiment, the keywords are chosen by reviewing search terms on a dashboard, such as a Google Search Console. Typically, a dashboard like this displays metrics for the website, such as top search queries that are converted into clicks and impressions, and the number of clicks and impressions for each query. In this way a user can select other target keywords that are popular among internet users who are searching for information on a particular subject, industry, company, product, or service. Alternatively, a user can use commercially available SEO tools that help identify keywords for a particular subject, industry, company, product, or service. Or a user can choose keywords in any other way they believe would be valuable search terms.

At step 304, a search engine search engine is queried with the at least one target keyword. In one embodiment, the search engine is queried programmatically. Python, libraries such as Beautiful Soup, and Selenium WebDriver may be used to query the search engine for particular keyword(s) and return the results.

Beautiful Soup is a Python library used for web scraping and parsing HTML and XML documents. It provides a convenient way to extract data from web pages by parsing the HTML (or XML) structure and navigating the elements of the document.

Selenium WebDriver is a popular open-source tool used for automating web browsers. It allows developers and testers to interact with web applications by simulating user actions such as clicking buttons, filling out forms, navigating through pages, and extracting information from web elements.

At step 306, the search engine results are received from the search engine. As disclosed above, the search engine results comprise source code. The source code comprises a plurality of websites ranked in an order determined by the search engine algorithm of the search engine. The source code comprises truncated descriptive text associated with at least some of each of the plurality of websites. In one embodiment the truncated descriptive text is a title. In another embodiment the truncated descriptive text is a description.

With reference to steps 304, 306, exemplary code to encode a query using the Google search engine comprises:

```
encoded_query = urllib.parse.quote(query)
url = f"https://www.google.com/search?q={encoded_query}"
```

With reference to steps 304, 306, exemplary code for receiving the first search engine results page comprises:
res=seo.get_serps(query, pages=1, domain='google.com')
In one embodiment, Python, Beautiful Soup, and Selenium WebDriver are configured to programmatically query a search engine with a keyword 304 and receive the search engine results 306.

At step 308, a high-ranking website is selected in the search engine results. This would typically comprise at least the first organic search result. In an alternate embodiment, a plurality of high-ranking websites are selected. For example the first five organic websites in the search results are selected. For example, reference to FIG. 2, exemplary high-ranking websites comprise websites 21, 24, and 27.

At step 310, the truncated descriptive text associated with the website selected in step 308 is extracted from the search engine results. With reference to the above disclosure and FIG. 2, the extracted descriptive text comprises a title 22, 25, 28. The extracted descriptive text may also comprise a description 23, 26, 29.

In one embodiment, the steps of 308 and 310 are carried out programmatically using Python, Beautiful Soup, and Selenium WebDriver.

At step 312, the number of characters in the truncated descriptive text is determined. In determining the number of characters in the truncated descriptive text, the ellipses (see disclosure above with reference to FIG. 2) are stripped from the descriptive text, that is the ellipses are not included in the character count. For the purposes of the disclosure, ellipses or equivalent non-descriptive characters used to represent that a portion of text has been truncated are referred to herein as non-descriptive characters. These non-descriptive characters are typically found at the end of the truncated text. Some examples of other non-descriptive characters may include hyphens or dashes or underscores, asterisks, brackets with ellipses, ellipses with spaces, and "Read More" links or similar.

In an alternate embodiment, in step 308 a plurality of high-ranking websites are selected, and in step 310 a plurality of truncated descriptive text from each of the plurality of high-ranking websites are extracted. Then, the number of characters is determined by averaging the length of each of the plurality of truncated descriptive text. Counting characters in a string and simple mathematical operations such as finding an average are a basic function available in nearly every programming and scripting language, including Python. In one embodiment, non-descriptive characters of the truncated descriptive text are not counted when determining length.

At step 316, the truncated descriptive text is rewritten with artificial intelligence (AI). The truncated descriptive text is rewritten so that it has a length no longer than the number of characters determined in step 312. In one embodiment the truncated descriptive text is rewritten so that it includes at least one instance of the at least one target keyword.

One example of an artificial intelligence is an artificial neural network. The artificial neural network may comprise a large language model. The artificial intelligence may include natural language processing techniques. The artificial intelligence may also comprise various publicly or commercially available AI models or systems including, but not limited to: ChatGPT, BING, Bard, Socratic, LaMDA, Chatsonic, Claude, and Jasper Chat. Furthermore, frameworks such as PyTorch may be used in combination with these AI systems.

In one embodiment the truncated descriptive text is rewritten by way of a ChatGPT API (Application Programming Interface). The API allows developers to integrate the ChatGPT model into their own applications, products, or services, enabling users to interact with the language model programmatically. With the ChatGPT API, developers make requests (for example in Python) to the OpenAI servers and receive responses generated by the ChatGPT model in real-time.

Exemplary Python code to rewrite the descriptive text comprising the title and an average title length determined is step 312 comprises:

```
response = llm_chain.run({"title": full_title, "character_len":
    avg_title_len})
```

Exemplary code to rewrite the descriptive text comprising the description for an average description length determined in step 312 comprises:

```
response = llm_chain.run({"meta_desc": meta_des, "character_len":
avg_meta_des_len})
```

In step 316, the target website source code is modified with the rewritten descriptive text of step 314. Recall that the source code of the target website comprises untruncated meta data. In one embodiment, the target website source code is modified by replacing the untruncated meta data of the target website with the associated rewritten truncated descriptive text. For example if the title 28 of FIG. 2 is rewritten, then the content of the meta title in the source code of the target website is replaced with the rewritten truncated text. Similarly, if the description 29 of FIG. 2 is rewritten, then the content of the meta description in the source code of the target website is replaced with the rewritten truncated text. The function of searching and replacing text is a basic function in Python and other programming languages.

In step 318, the target website is republished. In one embodiment using the Google search engine, republishing comprises resubmitting the website to the sitemap and Google Search Console. Other search engines such as Bing work similarly and provide similar consoles. This means updating and resending the website's sitemap file to Goggle's search index through the Search Console platform. A sitemap is a file that contains a list of all the URLs on the website. This helps search engines understand its structure and content. When a sitemap is resubmitted, Google or another search engine is notified about any changes or updates to the website's pages, ensuring that the search engine crawlers revisit and index the modified content. In this way, Google re-indexes and re-ranks the target website, including the modified parameters such as meta title and meta description. Republishing the website is done programmatically, for example with Python.

The steps 302-318 are periodically repeated as indicated by arrow 320, enabling continuous adaptation of the target website in response to the evolving search engine algorithms that index and rank websites.

Given the proprietary and undisclosed nature of these search engine algorithms, as well as the unpredictable frequency and types of changes, it is challenging to predict how such modifications will impact indexing and ranking. This disclosure presents a novel method wherein websites are dynamically modified in real-time, utilizing a specialized computing process that improves the operation of SEO systems and enhances the performance of computing resources. The invention addresses and solves unmet and difficult-to-meet needs in the field of search engine optimization by providing a solution that not only responds to but also anticipates and adapts to unpredictable algorithmic changes. By enabling adaptive modifications in response to these unpredictable changes, the disclosed invention provides a specific and practical technological improvement that meets long-standing challenges in website ranking and SEO practices To summarize, the target website can be ranked more highly for specific keyword searches by performing a programmatic search with those keywords, programmatically analyzing the code of the search result pages, rewriting the descriptive text using artificial intelligence techniques so that it mimics elements or features of the highest ranking organic websites, programmatically replacing the meta tag content in the target website with the rewritten text, and republishing the target website to cause the search engine to re-index and re-rank it. Furthermore, since actual knowledge of the search engine algorithm is a closely held secret, and the algorithm changes in unpredictable ways, the process is repeated to continuously modify the target website in response to the algorithm changes.

The method disclosed above is executed through software on an internet-connected computer. In one embodiment, a computer server hosts multiple target websites. By hosting these target websites, the server gains access to and can modify the source code of each website following the process detailed in FIG. 3. For instance, the server may comprise a hosted Wordpress site, accommodating various Wordpress websites. In other embodiments the server may host Shopify, Wix, Squarespace, Drupal, and nearly any other platform. Each website owner or administrator is provided with a dashboard, granting them the ability to select keywords (302 from FIG. 3) and access analytics, such as the Google Search Console. This allows administrators to monitor their website's performance and observe the impact of the website optimization method disclosed herein on search engine results.

In an alternative embodiment, the method disclosed herein and illustrated in FIG. 3 is executed by a web browser plugin capable of interacting with the source code of the target website and providing relevant information to the administrator. In one embodiment, this plugin is designed as a Wordpress plugin. With the plugin, administrators gain the ability to select a specific target keyword (302). The plugin then queries the search engine (304) to obtain search engine results (306). Subsequently, the plugin identifies a high-ranking website in the search results (308), extracts the truncated descriptive text (310), and determines its length (312). This truncated descriptive text (314) is then rewritten using artificial intelligence. By having direct access to the Wordpress administrator's console, where page design and code modifications can be performed, the plugin proceeds to modify the target website's meta tag with the rewritten descriptive text (316). Following this, the website is updated and republished (318).

This approach can be adapted for various other platforms, not limited to only Wordpress, allowing administrators of different websites to benefit from the web browser plugin's capabilities and optimize their content for improved search engine performance.

The methods and systems disclosed herein may be implemented on any computer communicating over any network. For example, the computers may include desktop computers, tablets, handheld devices, laptops and mobile devices. The mobile devices may comprise many different types of mobile devices such as cell phones, smart phones, portable computers, tablets, and any other type of mobile device operable to transmit and receive electronic messages.

One example of a mobile communication device is a smartphone such as an iPhone or Android phone. Another example of a mobile computing device is a tablet such as a computer tablet such as an iPad, Samsung Galaxy, Microsoft Surface. Other types of mobile communication devices include smart watches and smart glasses. Those skilled in the art will appreciate that there are many types of mobile communication devices compatible with the present invention.

The computer network(s) may include the internet and wireless networks such as a mobile phone network. Any reference to a "computer" is understood to include one or more computers operable to communicate with each other.

Computers and devices comprise any type of computer capable of storing computer executable code and executing the computer executable code on a microprocessor, and communicating with the communication network(s). For example, a computer may be a web server.

The systems and methods may be implemented on an Intel or Intel compatible based computer running a version of the Linux operating system or running a version of Microsoft Windows, Apple OS, Android, IOS, and other operating systems. Computing devices based on non-Intel processors, such as ARM devices may be used. Various functions of any server, mobile device or, generally, computer may be implemented in hardware and/or in software, including in one or more signal processing and/or application specific integrated circuits.

The computers and, equivalently, mobile devices may include any and all components of a computer such as storage like memory and magnetic storage, interfaces like network interfaces, and microprocessors. For example, a computer comprises some of all of the following: a processor in communication with a memory interface (which may be included as part of the processor package) and in communication with a peripheral interface (which may also be included as part of the processor package); the memory interface is in communication via one or more buses with a memory (which may be included, in whole or in part, as part of the processor package; the peripheral interface is in communication via one or more buses with an input/output (I/O) subsystem; the I/O subsystem may include, for example, a graphic processor or subsystem in communication with a display such as an LCD display, a touch screen controller in communication with a touch sensitive flat screen display (for example, having one or more display components such as LEDs and LCDs including sub-types of LCDS such as IPS, AMOLED, S-IPS, FFS, and any other type of LCD; the I/O subsystem may include other controllers for other I/O devices such as a keyboard; the peripheral interface may be in communication with either directly or by way of the I/O subsystem with a storage controller in communication with a storage device such a hard drive, non-volatile memory, magnetic storage, optical storage, magneto-optical storage, and any other storage device capable of storing data; the peripheral interface may also be in communication via one or more buses with one or more of a location processor such as a GPS and/or radio triangulation system, a magnetometer, a motion sensor, a light sensor, a proximity sensor, a camera system, fingerprint sensor, wireless communication subsystem(s), and audio subsystems.

A non-transitory computer readable medium, such as the memory and/or the storage device(s) includes/stores computer executable code which when executed by the processor of the computer causes the computer to perform a series of steps, processes, or functions. The computer executable code may include, but is not limited to, operating system instructions, communication instruction, GUI (graphical user interface) instructions, sensor processing instructions, phone instructions, electronic messaging instructions, web browsing instructions, media processing instructions, GPS or navigation instructions, camera instructions, magnetometer instructions, calibration instructions, an social networking instructions.

An application programming interface (API) permits the systems and methods to operate with other software platforms such as Salesforce CRM, Google Apps, Facebook, Twitter, Instagram, social networking sites, desktop and server software, web applications, mobile applications, and the like. For example, an interactive messaging system could interface with CRM software and GOOGLE calendar.

A computer program product may include a non-transitory computer readable medium comprising computer readable code which when executed on the computer causes the computer to perform the methods described herein. Databases may comprise any conventional database such as an Oracle database or an SQL database. Multiple databases may be physically separate, logically separate, or combinations thereof.

The features described can be implemented in any digital electronic circuitry, with a combination of digital and analog electronic circuitry, in computer hardware, firmware, software, or in combinations thereof. The features can be implemented in a computer program product tangibly embodied in an information carrier (such as a hard drive, solid state drive, flash memory, RAM, ROM, and the like), e.g., in a machine-readable storage device or in a propagated signal, for execution by a programmable processor; and method steps can be performed by a programmable processor executing a program of instructions to perform functions and methods of the described implementations by operating on input data and generating output(s).

The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any type of programming language (e.g., Objective-C, Python, Swift, C#, JavaScript, Rust, Scala, Ruby, GoLang, Kotlin, HTML5, etc.), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. Some elements of a computer are a processor for executing instructions and one or more memories for storing instructions and data. Generally, a computer will also include, or communicate with one or more mass storage devices for storing data files. Exemplary devices include magnetic disks such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) for displaying information to the user and a keyboard and a pointing device such as a mouse, trackball, touch pad, or touch screen by which the user can provide input to the computer. The display may be touch sensitive so the user can provide input by touching the screen.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wired and wireless packetized networks, and the computers and networks forming the Internet.

The foregoing detailed description has discussed only a few of the many forms that this invention can take. It is intended that the foregoing detailed description be understood as an illustration of selected forms that the invention can take and not as a definition of the invention. It is only the claims, including all equivalents, that are intended to define the scope of this invention.

What is claimed is:

1. A computer-implemented method for configuring machine-readable source code of a website to improve its search engine ranking executed by one or more processors of a network-connected computing system that hosts the website, comprising the steps of:

(a) providing a target website hosted on the network-connected computing system comprising source code, wherein the source code comprises a parameter, wherein the parameter comprises an untruncated meta tag that defines at least one of a meta title or a meta description displayed by a search engine;

(b) obtaining, as an input parameter, at least one target keyword to be associated with the target website;

(c) querying a search engine with the at least one target keyword;

(d) receiving search engine results comprising a search engine results page (SERP) from the search engine, wherein the SERP comprises source code, wherein the SERP source code comprises a plurality of websites ranked in an order determined by a search algorithm of the search engine, wherein the SERP source code comprises truncated descriptive text associated with at least some of each of the plurality of websites including at least one non-descriptive truncation character present in the SERP source code;

(e) selecting a high-ranking website in the search engine results;

(f) programmatically parsing the SERP source code and extracting from the search engine results the truncated descriptive text associated with the website selected in (e);

(g) determining a maximum character length based on the truncated descriptive text by identifying the non-descriptive truncation character in the SERP source code and excluding the non-descriptive truncation character from a character count;

(h) generating, via an artificial neural network, rewritten descriptive text constrained to the maximum character length determined in (g) and including at least one instance of the at least one target keyword;

(i) modifying the target website source code on the network-connected computing system by replacing the untruncated meta tag with the rewritten descriptive text generated in (h);

(j) republishing the target website, wherein the website is re-indexed and re-ranked by the search engine including transmitting an updated sitemap or search-index notification to the search engine; and (k) periodically repeating the steps of (b)-(j), whereby the target website source code is periodically modified in response to changes in the search engine algorithm including unknown and changing behavior which indexes and ranks the websites.

2. The method of claim 1, wherein the step of modifying the target website source code in (i) comprises replacing the untruncated meta tag of the target website with the rewritten descriptive text generated in (h).

3. The method of claim 1 wherein the high-ranking website in (e) is an organic website.

4. The method of claim 1 wherein the artificial neural network comprises a transformer-based neural network architecture.

5. The method of claim 4 wherein the artificial neural network comprises a large language model.

6. The method of claim 1 wherein the artificial neural network is implemented using at least one of: ChatGPT, Bing, Bard, Socratic, LaMDA, Chatsonic, Claude, Jasper Chat.

7. The method of claim 1 wherein the artificial neural network employs natural language processing techniques.

8. The method of claim 1 wherein the step of determining the number of characters in (g) further comprises not counting non-descriptive characters in the truncated descriptive text.

9. The method of claim 1 wherein the untruncated meta tag comprises a meta title.

10. The method of claim 1 wherein the untruncated meta tag comprises a meta description.

11. The method of claim 1 further comprising, wherein the source code of the target website comprises a plurality of parameters, each comprising an untruncated meta tag, and further comprising repeating the steps of (f)-(k) for each of the plurality of parameters.

12. The method of claim 1 further comprising, wherein the step of (e) further comprises selecting a plurality of high-ranking websites; wherein the step of (f) further comprises extracting a plurality of truncated descriptive text from each of the plurality of high-ranking websites; wherein the step of (g) further comprises determining the number of characters by averaging the length of each of the plurality of truncated descriptive text including excluding any non-descriptive truncation characters from each character count; and wherein the step of (h) further comprises rewriting the truncated descriptive text so that it has a length no longer than the average number of characters.

13. A non-transitory computer-readable medium comprising instructions which, when executed by a processor of a network-connected computing system that hosts a target website, causes the processor to perform the steps of:

(a) providing a target website hosted on the network-connected computing system comprising source code, wherein the source code comprises a parameter, wherein the parameter comprises an untruncated meta tag that defines at least one of a meta title or a meta description displayed by a search engine;

(b) selecting at least one target keyword to be associated with the target website;

(c) querying a search engine with the at least one target keyword;

(d) receiving search engine results comprising a search engine results page (SERP) from the search engine, wherein the SERP comprises source code, wherein the SERP source code comprises a plurality of websites ranked in an order determined by a search algorithm of the search engine, wherein the SERP source code comprises truncated descriptive text associated with at least some of each of the plurality of websites including at least one non-descriptive truncation character present in the SERP source code;

(e) selecting a high-ranking website in the search engine results;

(f) programmatically parsing the SERP source code and extracting from the search engine results the truncated descriptive text associated with the website selected in (e);

(g) determining a maximum character length based on the truncated descriptive text by identifying the non-descriptive truncation character in the SERP source code and excluding the non-descriptive truncation character from a character count;

(h) generating, via an artificial neural network, rewritten descriptive text constrained to the maximum character length determined in (g) and including at least one instance of the at least one target keyword;

(i) modifying the target website source code on the network-connected computing system by replacing the untruncated meta tag with the rewritten descriptive text generated in (h);

(j) republishing the target website, wherein the website is re-indexed and re-ranked by the search engine including transmitting an updated sitemap or search-index notification to the search engine; and (k) periodically repeating the steps of (b)-(j), whereby the target website source code is periodically modified in response to unknown and changing behavior in the search engine algorithm which indexes and ranks the websites.

14. The non-transitory computer-readable medium of claim 13 wherein determining the number of characters in (g) further comprises not counting non-descriptive characters.

15. A computer-implemented method for optimizing a website to improve its search engine ranking executed by one or more processors of a network-connected computing system comprising the steps of:

(a) providing a target website hosted on the network-connected computing system comprising source code, wherein the source code comprises a meta title and meta description that define text displayed by a search engine;

(b) obtaining, as an input parameter, target keywords to be associated with the target website;

(c) querying a search engine with the target keywords;

(d) receiving search engine results comprising a search engine results page (SERP) having SERP source code;

(e) selecting high ranking websites from the search results, wherein the websites comprise organic websites;

(f) extracting the titles and descriptions of the high-ranking websites from the SERP source code;

(g) analyzing the titles and descriptions of the high-ranking websites to determine a maximum untruncated title length and a maximum untruncated description length including identifying non-descriptive truncation characters in the SERP source code and excluding the non-descriptive truncation characters from each length determination;

(h) rewriting with with an artificial neural network,
   (i) the extracted title so that it has no more than the number of characters in the maximum untruncated title length and includes at least one instance of the target keywords; and
   (ii) the extracted description so that it has no more than the number of characters in the maximum untruncated description length and includes at least one instance of the target keywords;

(i) replacing the content of the meta title in the source code with the rewritten extracted title, and replacing the content of the meta description in the source code with the rewritten extracted description;

(j) republishing the target website, wherein the website is re-indexed and re-ranked by the search engine including transmitting an updated sitemap or search-index notification to the search engine; and (k) periodically repeating the steps of (b)-(j), whereby the target website source code is periodically modified in response to unknown and changing behavior in the search engine algorithm.

16. The method of claim 15 wherein the artificial neural network comprises a transformer-based neural network architecture.

17. The method of claim 16 wherein the artificial neural network comprises a large language model.

18. The method of claim 15 wherein the artificial neural network is implemented using at least one of: ChatGPT, Bing, Bard, Socratic, LaMDA, Chatsonic, Claude, Jasper Chat.

\* \* \* \* \*